Jan. 24, 1961 W. J. CALDWELL 2,969,009
CENTRIFUGAL TAKE-OFF AND CONTROL NOZZLE
Filed July 14, 1958
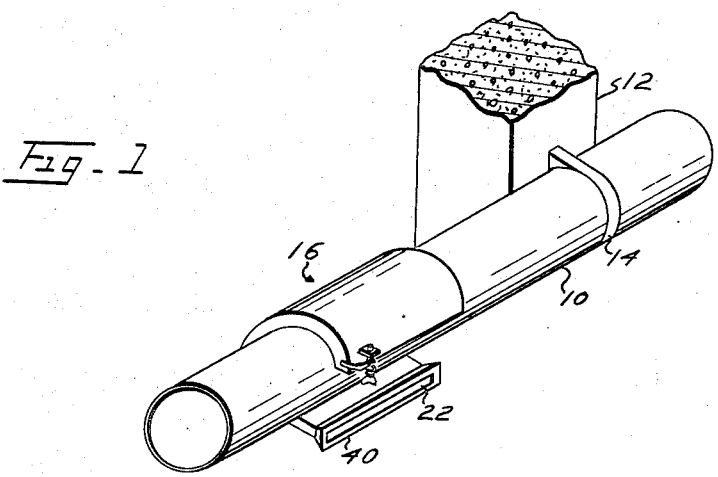
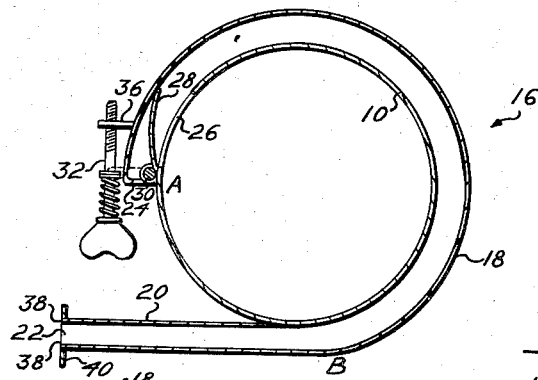
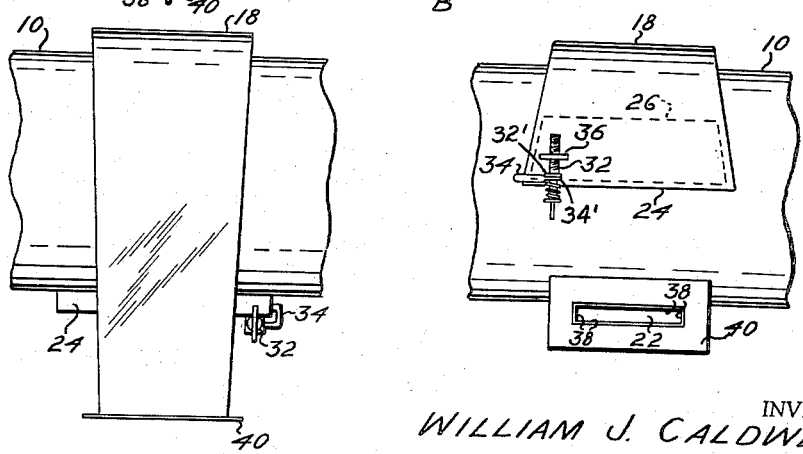
INVENTOR
WILLIAM J. CALDWELL
BY Beaman & Beaman
ATTORNEY

United States Patent Office 2,969,009
Patented Jan. 24, 1961

2,969,009

CENTRIFUGAL TAKE-OFF AND CONTROL NOZZLE

William J. Caldwell, P.O. Box 456, Independence, Mo.

Filed July 14, 1958, Ser. No. 748,500

9 Claims. (Cl. 98—40)

The invention relates to a takeoff and nozzle for use with air ducts and particularly pertains to an air takeoff and control nozzle as used with air conditioning and ventilation systems.

In the installation of air conditioning systems and the like in old buildings the problem of headroom and clearance for the ducts and air outlets often becomes acute and the necessary modifications to the building to accommodate the system often make the installation very expensive if not prohibitive. Air distribution, especially in a large area, may be simplified if high velocities are used which will throw the air a considerable distance and thus eliminate ductwork which would be necessary with a low velocity system; however, when using high velocity air with nozzles of known construction the noise produced by the air is usually of such a high level to be objectionable in areas occupied by people engaged in relatively quiet occupations, such as clerical work.

It is thus an object of the invention to provide an air nozzle for air conditioning and ventilating systems which is capable of handling high velocity air without creating objectionable noise.

Another object of the invention is to provide an air takeoff and nozzle for use with an air duct which is of sufficient length to produce a smooth air flow, to reduce noise, yet is very concise in size and requires little head room.

Yet another object of the invention is to provide an air nozzle wherein centrifugal force is utilized to aid in creation of a smooth air flow.

A further object of the invention is to provide an air nozzle for use with a circular duct which is of simple construction and may be economically manufactured.

These and other objects of the invention will become apparent when reviewed with reference to the following description and accompanying drawings wherein:

Fig. 1 is a perspective view of a duct, take off, nozzle and support column as would be used in a typical installation of the invention.

Fig. 2 is a cross section elevational view of the duct and associated air nozzle in accordance with the invention.

Fig. 3 is a front elevational view of the nozzle as mounted on a duct and

Fig. 4 is a bottom view of the nozzle and duct of the invention.

The shape and constructional features of the nozzle are best employed with a circular duct and the description will be limited to such as installation.

As viewed in Fig. 1, a typical installation would include a circular air duct 10 receiving air under pressure from an air conditioning unit or ventilating fan which may be supported to the columns 12 of a building by a mounting bracket 14. Axially spaced along the ducts 10 will be placed a series of air takeoff chambers and nozzles 16 to inject the air of the duct into the area to be conditioned. The nozzles will be spaced and directed in accordance with the room size, velocity of the air, and location of the duct for the desired distribution.

The takeoff and nozzle 16 consists of a flow chamber of rectangular cross section which is circumferentially wrapped about the duct 10 and in the illustrated embodiments is adopted to discharge the air below the duct. As best shown in Fig. 2, the takeoff flow chamber preferably encompasses the duct 10 throughout three quarters of the periphery and from point A to point B is formed of an outer circular shell 18 of sheet metal concentric with the duct 10. The inner wall of the flow chamber if formed by the duct itself in the simplest construction and thus from A to B a flow chamber of equal height will be defined about the duct 10. At point B the flow chamber tangentially leaves the periphery of the duct and the shell 18 and a wall 20 of planar shape project laterally from the duct to direct the air in a linear path before leaving the nozzle 22. The height of the flow chamber is reduced from point B to the nozzle 22 with respect to the height of the chamber from A to B to provide a choking action which tends to smooth out the air flow. Preferably the reduction in flow chamber height of B is sufficient to reduce the flow area from 25% to 50% of the area if this height reduction was not employed.

The width of the flow chamber uniformly decreases to a minimum at the nozzle 22 as shown in Figs. 3 and 4. The end of the flow chamber is closed by a wall 24 which would represent the maximum width of the chamber. The chamber tapers as it continues about the duct 10. Thus the wedge-like width construction of the chamber permits an increased air flow over a chamber of parallel sides and increases velocity of the air at the nozzle.

The air is introduced into the flow chamber through an opening 26 formed in the duct 10. Opening 26 preferably extends the width of the chamber and extends along the periphery of the duct a sufficient distance to provide an opening area 50% to 100% or more greater than the area of the flow chamber at this point to maintain the air velocity passing through the opening in the quiet range. An arcuate opening damper valve 28 is pivotally supported within the flow chamber at pivot 30 and is adopted to be adjustably positioned between a full open or closed position to regulate the flow of air through the opening 26. A maunal adjustment screw 32 co-acts with a U-shaped extension 34 of the pivot 30 and is threaded into a fixed bracket 36 mounted on the flow chamber shell 18. Thus as the screw 32 is adjusted the damper 28 will be opened or closed as desired to regulate the flow of air from the nozzle 22. It will be appreciated that the illustrated manual control of the valve damper is only one way of controlling the damper position. Automatic air flow regulation may be achieved by substituting a liquid filled bellows responsive to temperature variation for the screw 32 or a thermostatically controlled electric linear actuator may be used to pivot the damper.

In more detail, the adjustment screw 32 has a collar 32'. The extension 34 is flattened at one end 34' and has a hole therein through which the screw 32 extends with clearance. A spring 35 reacts between the head 37 of the screw 32 and the end 34' to hold the end 34' yieldingly against the underside of the collar 32'. As the extension 34 is an integral extension of the pivot 30 and the pivot 30' is, in turn, fixed to the damper 28, by rotating the screw 32 the damper 28 may be pivoted back and forth relative to the opening 26. When the damper 28 is in fully closed position it will be held in that position by the pressure built up through the rotation of the screw 32 against the spring 30.

It is very important in using high velocity air that the air flow be undisturbed if the noise level is to be kept to a minimum and therefore the edges 38 of the nozzle 22 are very sharp and free from burrs and other obstructions. The nozzle end is preferably reinforced by a frame element 40 to prevent flutter or distortion of the flow path.

The invention above described is capable of providing air with a velocity at nozzle 22 of 6,000 F.P.M. without producing more than 50 to 54 decibles which would not be objectionable in an office work area and upon lining the flow chamber walls with an acoustical lining, such as fibre glass cloth, the noise level is further reduced. As the air moves through the flow chamber at a high rate of velocity the centrifugal force acting on the air is considerable and it is believed that this action in conjunction with the reduced height of the chamber adjacent the nozzle are largely responsible for the greatly increased ability of the air takeoff of the invention to provide higher air velocities at low noise levels over prior constructions.

The takeoff flow chamber construction requires very little head room and may be employed in installations where use of conventional designs would be prohibitive costwise or practically impossible. For instance, where a 4" duct is used, the overall diameter of the shell 18 is only 5" and thus little more clearance than that for the duct is needed.

The invention is described above wherein the flow chamber is applied directly to the duct itself for illustrative purposes. In actual use the flow chamber would, of course, be in the form of a pre-fabricated unit which is interposed in the duct line; however, the dimensions and relationships would be the same as if the chamber were mounted on the duct itself and the concept of the invention is the same. Another modification which may be incorporated within the scope of the invention would be to form the sides of the flow chamber parallel instead of converging; however, still maintaining the reduced chamber height from point B to nozzle 22.

I claim:

1. In combination with a longitudinally extending air duct of circular cross-section, an air takeoff for use with said air duct having wall structure defining a flow chamber having an arcuate portion peripherally disposed about a portion of said duct, said flow chamber having a linear portion tangentially disposed to said arcuate portion, an opening defined in said duct in communication with said arcuate portion, a nozzle opening defined in said linear portion adapted to direct air discharged therethrough tangential to said arcuate portion and means reducing the flow chamber area at the junction of said arcuate and linear chamber portions.

2. In combination with a longitudinally extending air duct of circular cross section, an air takeoff for use with said air duct having wall structure defining a flow chamber having an arcuate portion of constant height peripherally disposed about a portion of said duct, said flow chamber having a linear portion of constant height tangentially disposed to said arcuate portion, the height of said arcuate portion being greater than the height of said linear portion, an opening defined in said duct in communication with said arcuate portion, a nozzle opening defined in said linear portion adapted to direct air discharged therethrough tangential to said arcuate portion and means within said arcuate portion adapted to adjustably regulate the amount of air passing through said duct opening.

3. In an air takeoff as in claim 2 wherein the width of said flow chamber uniformly decreases from said duct opening to said nozzle opening.

4. In combination with a longitudinally extending air duct in which pressurized air used in conditioning living spaces flows at relatively high velocity, an air take off for use with said air duct for distributing the air in said duct into said spaces at a relatively low sound level, said take off having wall structure embracing said duct and defining an enclosed air flow chamber located exteriorly of said duct and having inner and outer openings at opposite ends between which air is conducted from said duct along a nonlinear path disposed in a plane substantially normal to the longitudinal axis of said duct for effecting substantially tangential discharge of the air from said duct into said spaces, said inner opening being located at the air inlet end of said chamber and communicating with a discharge opening defined in that portion of the wall of said duct embraced by said chamber, said chamber having a duct-embracing part and a discharge part, said discharge part being disposed in substantially tangential relation to the wall of said duct and having said outer opening defined by the outer end thereof, the inner end of said discharge part at points of junction with said embracing part being circumferentially spaced from said inner opening a distance greater than the width of said inner opening measured in a direction parallel to the longitudinal axis of said duct whereby the air flow from said duct through said chamber conforms to said path.

5. In the combination of claim 4, the cross-sectional area of said air chamber being progressively reduced from said junction between said parts to said outer end.

6. In the combination of claim 4, wherein that portion of said duct embraced by said air flow chamber provides part of the wall structure of said air flow chamber.

7. In the combination of claim 4 wherein said air flow chamber embraces in excess of 180° of the circumference of said duct.

8. In the combination of claim 4, the cross-sectional area of said air chamber being progressively reduced between said inner and outer openings.

9. In the combination of claim 4, the cross-sectional area of said air chamber being progressively reduced throughout at least a portion thereof between said inner and outer openings.

References Cited in the file of this patent

UNITED STATES PATENTS

| | | |
|---|---|---|
| 328,227 | Kennedy et al. | Oct. 13, 1885 |
| 475,010 | Costa | May 17, 1892 |
| 1,506,904 | Harrison | Sept. 2, 1924 |
| 2,313,256 | Morgan | Mar. 9, 1943 |